United States Patent [19]

Viernickel et al.

[11] Patent Number: 4,769,745
[45] Date of Patent: Sep. 6, 1988

[54] SEALED CAPACITOR WINDING CONTAINER AND PROCESS FOR HERMETICALLY SEALING ELECTRICAL COMPONENT CONTAINER WITH A LID

[75] Inventors: Konrad Viernickel, Berlin; Johann Wartusch, Vellmar, both of Fed. Rep. of Germany

[73] Assignee: Licentia Patent Verwaltungs-GmbH, Fed. Rep. of Germany

[21] Appl. No.: 50,055

[22] Filed: May 14, 1987

[30] Foreign Application Priority Data

May 29, 1986 [DE] Fed. Rep. of Germany ....... 3618066

[51] Int. Cl.⁴ .............................................. H01G 9/00
[52] U.S. Cl. ..................................................... 361/433
[58] Field of Search ................. 361/433; 220/359, 378

[56] References Cited

U.S. PATENT DOCUMENTS

| | | | |
|---|---|---|---|
| 2,795,348 | 6/1957 | Kunik | 220/359 |
| 3,331,528 | 7/1967 | Racek | 220/378 X |
| 3,515,951 | 6/1970 | Krasienko et al. | 361/433 |
| 3,644,796 | 2/1972 | Carino | 361/433 |
| 3,648,337 | 3/1972 | Greskamp et al. | 29/25.42 |
| 3,685,682 | 8/1972 | Frey | 220/359 |

FOREIGN PATENT DOCUMENTS 2304146 1/1984 Fed. Rep. of Germany .

Primary Examiner—Donald A. Griffin
Attorney, Agent, or Firm—McGlew and Tuttle

[57] ABSTRACT

A process of sealing a housing having a radially projecting rim around an open end of the housing using a gasket of a similar thermoplastic material as the lid and a bonding ring also of the thermoplastic material comprising positioning the gasket between the lid (2) and the rim (7), and the bonding ring below the rim, and in contact with the lid, and pressing the lid onto the gasket while welding the ring to the lid.

A process is described for the hermetic sealing of a can-shaped housing of an electrical component with a lid, and a gasket between a housing rim protruding outwardly of the housing top and lid, that permits short process times and leads to components that are suitable for higher voltages with small dimensions. A bonding ring of thermoplastic synthetic material is laid under the housing rim of the metal housing. After the installation of the gasket of the same thermoplastic synthetic material as the lid between the housing rim and the lid, the lid brought into contact with the bonding ring. Finally, the lid is then pressed onto the gasket and simultaneously welded to the bonding ring, preferably by ultrasonics.

4 Claims, 1 Drawing Sheet

U.S. Patent    Sep. 6, 1988    4,769,745
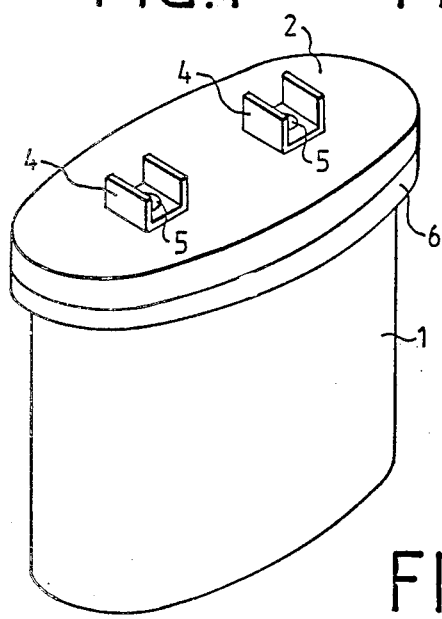
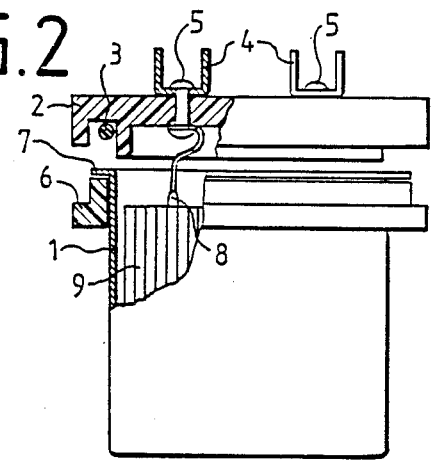
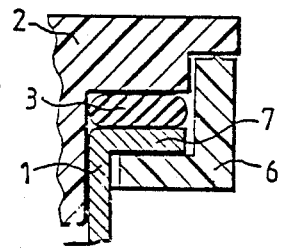
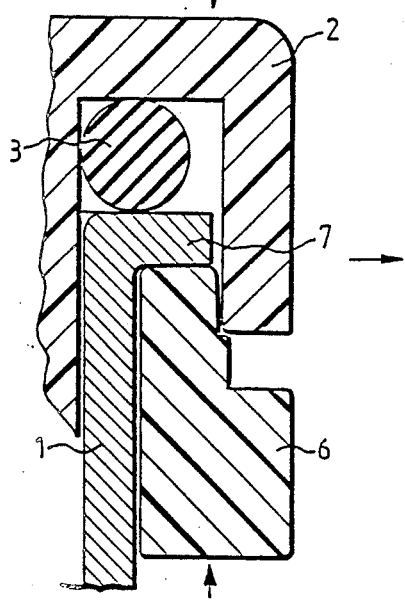
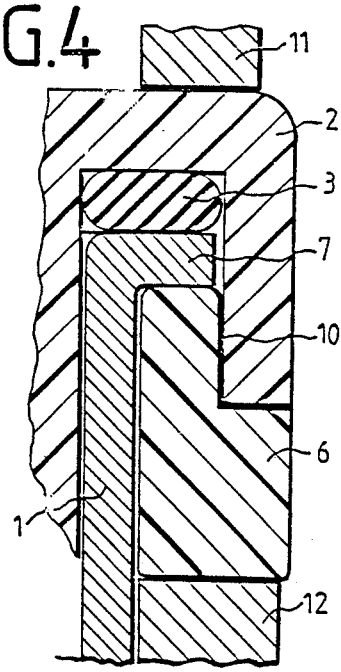

SEALED CAPACITOR WINDING CONTAINER AND PROCESS FOR HERMETICALLY SEALING ELECTRICAL COMPONENT CONTAINER WITH A LID

FIELD AND BACKGROUND OF THE INVENTION

This invention relates in general to a capacitor's container and in particular to a new and useful process for hermetically sealing an electrical component container with a lid and to a capacitor winding sealed container construction.

A similar can-shaped housing for an electrical component, especially for capacitors, with an outward-protruding rim, that is sealed hermetically with a lid and a gasket between the lid and the housing rim, is known from German Patent No. 879 733. For the closure, the metal lid must be pressed against the housing, so that a suitable sealing pressure is exerted on the gasket, whereby a part of the lid that overlaps the housing rim is formed into a bead behind the rim. Such a closure is unsuitable for the efficient manufacturing of electrical components. It is even less suitable when the cross section of the can-shaped housing has an oval-cylindrical shape. Furthermore, if the lid is made of plastic, a beading is possible only by a hot pressing process (German Patent Application P No. 35 16 658.4).

The brochure of Branson Schallkraft GmbH, D-6056 Heusenstamm, "Economical Bonding of Plastics", discloses how to bond thermoplastic materials; bonding can be done by ultrasonics in particular.

Despite the multiple applications of plastic welding, it has not been used heretofore to seal the housing of electrical components with a lid, specifically for capacitors impregnated with fluid insulating oil. On the one hand, the can-shaped housing is made of metal for definite reasons, so that a hermetic weld is out of the question for that reason; on the other hand, it has been suspected that the materials may have negative electrical effects on the insulating oil that occur because of an increase in tan δ from extractable substances during the bonding, and that various impregnating fluids in the housing, such as isopropylbiphenyl, for instance, will interfere with the bonding procedure or prevent a hermetic seal.

SUMMARY OF THE INVENTION

The invention provides a process for the tight bonding of a metal housing of arbitrary oval-cylindrical cross section, which contains any desired liquid dielectric, to a plastic lid, and in economical mass production.

It has been found that this process permits very short process cycles with manufacturing tolerances playing no role. The time saved for the closure is significant, especially with an oval-cylindrical cross section of the housing. Contrary to expectations, the customary impregnating liquids for capacitors in housings do not interfere with the welding process, since they are largely pressed out of the weld area because of their low viscosity and relatively high vaporizability. An undesirable increase of tan δ of a capacitor's insulating oil contained in the can-shaped housing from any extractable components of the gasket or of the lid can be avoided by suitable choice and formulation of the materials. For example, the lid can be molded from glass fiber-reinforced polyamide. The gasket selected is beneficially made of a rubber material that releases no substances that impair the insulating oil dielectrically. A thermosetting silicone elastomer is used as the rubber material, whose swelling in the insulating oil amounts to between 10% and 80%, preferably between 20% and 30%.

Since the length of the insulating section from the electrical connectors of the component, ordinarily located on the top of the lid, to the metal housing, is large because of the bonding of the plastic lid to the plastic bonding ring, additional insulation otherwise required around these connectors can be omitted, and the components can beneficially be made in smaller dimensions for higher voltages.

Accordingly, it is an object of the invention to provide a process of sealing a housing which has a radially projecting rim around an open end thereof using a gasket of similar thermoplastic material as the lid and a bonding ring which is also of the thermoplastic material and comprising positioning the gasket between the lid and rim and positioning the bonding ring below the rim and in contact with the lid and pressing the lid into the gasket while welding the ring to the lid.

A further object of the invention is to provide a capacitor winding field container which includes a container housing having an open end with a rim and with a lid closing the container with the interposition of a thermoplastic ring between the lid of the thermoplastic material and the rim, a capacitor winding into the container having a terminal load connected electrically to a leading ribbon extending through the lid securing an electrical terminal on the exterior of the lid, comprising a gasket of a thermoplastic material comparable to the thermoplastic material of the lid, a bonding ring embedding against the rim from the opposite side thereof from said lid and said gasket contacting said lid and being bonded thereto.

A further object of the invention is to provide a sealed container having a capacitor winding having a lid through which the capacitor winding is electrically extended and which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

While specific embodiments of the invention have been shown and described in detail to illustrate the application of the principles of the invention, it will be understood that the invention may be embodied otherwise without departing from such principles.

BRIEF DESCRIPTION OF THE DRAWINGS

In the drawings:

FIG. 1 is a bunt top perspective view of a capacitor sealed by the process pursuant to the invention;

FIG. 2 is a partial broken away section through a weld area with the lid and the housing before the welding;

FIG. 3 is an enlarged partial section through a weld area with the lid and the housing before the welding;

FIG. 4 is a section of the area shown in FIG. 3 after welding; and

FIG. 5 is a sectional view through a weld area similar to that of FIG. 3 of another embodiment of the invention.

GENERAL DESCRIPTION OF THE PREFERRED EMBODIMENTS

Referring to the drawings in particular, the invention embodied therein comprises a capacitor winding container or housing 1 having a capacitor winding 9 therein with a terminal 8 which is connected electrically to a leading ribbon 5 which secures a terminal 4 to the exterior of a lid 2 which closes the container or housing 1.

In accordance with the invention the container is sealed by positioning a gasket 3 of a material similar to the lid 2 over a rim 7 of the container housing and positioning a bonding ring 6 below the rim which is also made of a thermoplastic material and simultaneously pressing and welding the lid to the bonding ring while compressing and sealing the gasket between the lid and the rim.

FIG. 1 shows a view of an electrical component in the form of an electrical capacitor whose metallic housing with an oval-cylindrical cross section is to be sealed hermetically to a lid 2 of thermoplastic synthetic material. On the lid 2 are the customary electrical connectors 4 with lead-in rivets 5. As a rule, aluminum is used as the metal for the housing 1.

FIG. 2 shows the capacitor depicted in FIG. 1 in sectional view before sealing. Capacitor windings 9, preferably impregnated with an impregnating fluid (such as isopropylbiphenyl), that are connected through terminal lugs 8 to the lead-in rivets 5, and thus are also connected electrically to the electrical connectors 4, are located in the housing 1, which has a housing rim 7 protruding outward.

The lid 2 has a groove with a gasket ring 2a facing the housing rim 7 and with a width conforming to it. This consists of an elastic material, preferably rubber.

A bonding ring 6, likewise of thermoplastic material, is laid under the housing rim 7. For easier assembly, the bonding ring 6 can also comprise two half-rings which touch at the cut ends.

FIG. 3 shows in detail the arrangement of the area in which a hermetic joint is to be produced between the lid 2 and the housing 1 in accordance with the process pursuant to the invention.

After the bonding ring 6 is placed under the housing rim 7 and a gasket 3 is placed between the housing 1 and the lid 2, the lid 2 is brought into contact with the bonding ring as indicated by the vertical arrows in FIG. 3.

The gasket 3 is then compressed as in FIG. 4 by laying the bonding ring 6 on an anvil 12 and simultaneously applying pressure from a sonotrode 11 of an ultrasonic welder (not shown in detail) to the lid 2 (or by appropriate counterpressure on the housing and the anvil 12), so that a sufficiently high gasket pressure is produced between the lid 2 and the housing 1. The force of the pressure can amount to 1500 N to 2000 N, for example. The thermoplastic of the lid 2 and of the bonding ring 6 is simultaneously heated in the weld area by the ultrasonic waves introduced through the sonotrode to such a degree that the molten seam areas of the two parts intermix. As a rule, this process takes less than 1 sec. A heated hot bonding area 10 then cools for only a few seconds with pressure being maintained between the lid 2 and the housing 1, which makes a permanent and hermetic, uniformly strong bond between the welded parts.

Any impregnating fluid still present in the bonding area 10 is pressed out by the pressure between the housing 1 or the bonding ring 6 and the lid 2, or vaporizes at the beginning of the heating process, so that the fluid does not obstruct the welding process.

It can be seen that a relatively long insulating section between the electrical connectors 4 on the lid 2 and the metal housing 1 is produced by the part of the lid 2 that is drawn over the housing rim 7, which permits the components produced by the time-saving closure process of the invention to be suitable for higher voltages (e.g., over 1 kV) with smaller dimensions.

Another form of the bonding ring $6^1$ is shown in FIG. 5. This ring is drawn over the housing rim 7 to the lid. With ultrasonic bonding between the lid 2 and the bonding ring $6^1$, this arrangement has the advantage that the housing 1 does not rest directly on the vibrating system. This results in a reduced requirement for welding energy. Also, the welding conditions are more readily reproducible since they do not depend on the housing 1 (and its filler).

What is claimed is:

1. A process for the hermetic sealing of a can-shaped metal liquid impregnated capacitor housing having a metallic housing rim using a plastic lid having an elongated skirt with a compressible gasket arranged between the housing rim and the lid, comprising arranging a plug-like bonding (rim) gasket of thermoplastic material under the rim of the metal housing, bringing the lid skirt into contact with an outer surface of said plug-like gasket after placement of the said plug-like gasket of the same thermoplastic material as the plastic lid between the rim of the housing and the lid skirt, then pressing the lid against the plug-like gasket and at the same time circumferentially bonding the said plug-like gasket and the lid skirt together.

2. A process according to claim 1 wherein bonding and heat sealing is supplied to the metal housing to a bonding area between the bonding ring and the lid by ultrosonics.

3. A process according to claim 2 wherein two-half rings are laid under the housing rim to form said bonding ring.

4. A process according to claim 1 wherein the rubber material used comprises a thermally crosslinked silicone elastomer having swelling in the insulating oil, having from between 10 to 80% preferably from between 20 to 30%.

* * * * *